United States Patent [19]

Cox et al.

[11] Patent Number: 5,118,447
[45] Date of Patent: Jun. 2, 1992

[54] THERMOCHEMICAL NITRATE DESTRUCTION

[75] Inventors: John L. Cox; Richard T. Hallen; Michael A. Lilga, all of Richland, Wash.

[73] Assignee: Battelle Memorial Institute, Richland, Mass.

[21] Appl. No.: 684,717

[22] Filed: Apr. 12, 1991

[51] Int. Cl.$^5$ .......................... G21F 9/00; C02F 1/72
[52] U.S. Cl. .................... 252/626; 210/761; 210/758; 210/903; 423/DIG. 20
[58] Field of Search ................. 210/903, 758, 761; 252/626; 423/DIG. 20

[56] References Cited

U.S. PATENT DOCUMENTS 3,962,114 6/1976 Berreth ........................... 252/626
4,968,436 11/1990 Gutekunst et al. ............... 210/743

FOREIGN PATENT DOCUMENTS 1059307 7/1979 Canada.
2025686 1/1980 United Kingdom.

OTHER PUBLICATIONS

Meile, LJ; Johnson, AJ; 1983. "Waste Generation Reduction—Nitrates FY 1983 Status Report", RFP-3619, UC-70 Nuclear Waste Management, DOE/TIC-4500 (Rev. 72).

Meile, LJ; Johnson, AJ; 1982. "Waste Generation Reduction—Nitrates FY 1982 Status Report", RFP-3465, UC-70 Nuclear Waste Management, DOE/TIC-4500 (Rev. 72).

Gunderloy, FC, Jr.; Fujikawa, CY; Dyan, VH; Grid, S; 1968. "Dilute Solution Reactions of the Nitrate Ion as Applied to Water Reclamation", Report No. TWRL-1.

Gunderloy, FC, Jr.; Wagner, RI; Dyan, VH; 1970. "Development of a Chemical Denitrificatoin Process", EPA 17010 EEX/70.

Merz, ER. Overview on the Application of Denitration in the Nuclear Field, Denitration of Radioactive Liquid Waste, 1986.

Cecille, L.; Kelm, M., Chemical Reactions Involved in the Denitration Process with HCOOH and HCHO, Denitration of Radioactive Liquid Waste, 1986.

Kelm, M.; Oser, B., Drobnik, S. Denitration of Reprocessing Concentrate by means of HCOOH, Denitration of Radioactive Liquid Waste, 1986.

Primary Examiner—Brooks H. Hunt
Assistant Examiner—Ngochan T. Mai
Attorney, Agent, or Firm—Paul W. Zimmerman

[57] ABSTRACT

A method is disclosed for denitrification of nitrates and nitrates present in aqueous waste streams. The method comprises the steps of (1) identifying the concentration nitrates and nitrites present in a waste stream, (2) causing formate to be present in the waste stream, (3) heating the mixture to a predetermined reaction temperature from about 200° C. to about 600° C., and (4) holding the mixture and accumulating products at heated and pressurized conditions for a residence time, thereby resulting in nitrogen and carbon dioxide gas, and hydroxides, and reducing the level of nitrates and nitrites to below drinking water standards.

52 Claims, No Drawings

THERMOCHEMICAL NITRATE DESTRUCTION

This invention was made with Government support under Contract DE-AC06-76RLO 1830 awarded by the U.S. Department of Energy. The Government has certain rights in the invention.

FIELD OF THE INVENTION

The present invention relates to a method of denitrification of nitrogen compounds and more specifically, nitrates and nitrites, which are found in aqueous waste streams. Such streams may result from processes such as explosives manufacturing, nuclear processing, and metal finishing plants. Treatment by this method results in a substantially complete conversion of the nitrogen in the nitrates and nitrites to harmless nitrogen gas.

As used herein, the term aqueous is used to mean of, relating to or resembling water in a liquid or a supercritical phase.

BACKGROUND OF THE INVENTION

Nitrate, nitrite and nitro compounds are often present in non-radioactive aqueous mixed waste streams such as nitrate wastes at metal finishing plants, and chemical and munitions plants. Nuclear materials production facilities also generate waste streams containing both nitrate, nitrite and nitro compounds and radioactive materials. A survey performed in 1981 indicated that there were in excess of $1.2 \times 10^8$ Kg of nitrate wastes stored at Department of Energy and commercial nuclear facilities in the United States.

In many waste or process streams, the concentration of nitrogen compounds is below 1%, which is insufficient for cost effective removal of nitrates by traditional means. Removal of nitrogen compounds may be complicated by the presence of hazardous chemicals and/or radioactivity. Moreover, nitrate and nitrite compounds at elevated concentration in a waste stream present problems such as nitrogen oxides ($NO_x$) emission upon disposal by incineration, and public health risk upon disposal by drainage into bodies of water.

Traditional methods for removing nitrogen compounds from aqueous media include ion exchange, extraction, membranes, biological denitrification, and incineration.

The Nalco Water Handbook, 1979, pp. 6-11, describes anion exchange as "(t)he only chemical process that removes nitrate". However, the anion exchange process suffers from a number of disadvantages including 1) the anion exchange resin must be regenerated or disposed of, 2) additional waste is produced upon resin regeneration and/or disposal, and 3) anion exchange resin is damaged by radioactivity.

Extraction and membranes, like anion exchange, generate additional waste.

Conventional bacterial systems usually require a settling pond or biological reactor, are carried out at temperatures below 30° C., require equipment designed to handle great quantities of air and water and require residence times on the order of days to reduce nitrate concentrations to acceptable limits.

In cases where nitrate bearing waste streams are incinerated, undesirable nitrogen oxide ($NO_x$) emissions which contribute to air pollution and acid rain are produced. $NO_x$ can be combined with ammonia and destroyed by gas phase reactions at temperatures between 1000° C. and 1100° C. (known as thermal deNOx) or by selective catalytic reduction, at temperatures between 650° C. and 750° C. in the presence of a catalyst to convert the $NO_x$ to nitrogen, oxygen, and water. Disadvantages of treating nitrous oxides in the gas phase include, but are not limited to, 1) the large size of the equipment required for handling gases, 2) the high temperature operation, 3) handling potentially corrosive condensate after the gas stream is cooled, 4) additional energy required to evaporate the water, and 5) the cost of disposal of a spent catalyst after processing radioactive wastes.

Research efforts have shown promise, but have neither achieved nitrate removal to drinking water standards, nor achieved substantially complete conversion of nitrates to nitrogen gas. Current national drinking water standards for nitrates are 44 mg/l. Although no standard exists for nitrites, the goal is 3 mg/l.

Research by L. J. Miele and A. J. Johnson, Waste Generation Reduction--Nitrates FY 1983 Status Report, Rockwell International, RFP-3619, Feb. 16, 1984, reports results of nitrate removal methods by use of 1) reducing agents, 2) reaction promoters, and 3) catalysts. However, all but one method provided nitrate removals less than 55%. Only the method using formic acid achieved 96% removal of nitrate. The report concludes that "(n)o aqueous denitrification procedure has produced results equal to . . . thermal methods . . . ".

Further research of denitrification with formic acid is presented in Denitration of Radioactive Liquid Waste edited by L. Cecille and S. Halaszovich 1986. One article, Overview on the Application of Denitration in the Nuclear Field, E. R. Merz, discloses reactions between formic acid and nitric acid resulting in $N_2O$, $NO_x$, carbon dioxide and water. Another article, Chemical Reactions Involved in the Denitration Process with HCOOH and HCHO, L. Cecille and M. Kelm, discloses reactions between nitrous acid and formic acid resulting in ammonia, carbon dioxide, and water. A third article, Denitration of Reprocessing Concentrate by Means of HCOOH, M. Kelm, B. Oser, and Drobnik, discloses reactions between nitric acid and formic acid resulting in $N_2O$, NO, $N_2$, carbon dioxide and water. Overall, between 81% and 99% of the nitrate is converted. However, only 3% of the nitrate is converted to nitrogen gas, with 83% converted to $N_2O$ and 15-20% converted to NO.

Although it is recognized that formic acid is one of the best reductants of aqueous nitrates, research efforts prior to the present invention have not been successful in obtaining nitrate removal to below drinking water standards and have not achieved substantially complete conversion of the nitrogen in the nitrate to nitrogen gas.

Prior to the present invention, removal of nitrates and nitrites from aqueous waste streams was a difficult and expensive task. The present invention is therefore directed toward a method of removing nitrates and nitrites from aqueous waste streams by converting the nitrogen in the nitrates and nitrites to nitrogen gas with little or no formation of nitrous oxides such as NO, $NO_2$ and $N_2O$. The method of the present invention relies upon aqueous phase reactions at moderate temperatures and pressures without the use of a catalyst and without the subsequent regeneration and/or disposal of a catalyst in both non-radioactive and radioactive waste treatment.

SUMMARY OF THE INVENTION

The present invention comprises a method of removing nitrates and nitrites, which may be present in non-radioactive and radioactive aqueous waste streams by converting the nitrogen in the nitrates and nitrites to harmless nitrogen gas. The method of the invention results in substantially complete conversion.

The method of the present invention can be used alone or in combination with existing processes including, but not limited to, ion exchange, electro-dialysis, distillation, reverse osmosis membrane purification, and electroplating. The combination of processes may be performed in a separate reaction vessel or may be combined in a single, existing reaction vessel. For example, electroplating may be performed first to remove heavy metals and then the process of the invention disclosed herein applied to remove the nitrates.

The method of the present invention comprises the steps of identifying the concentration of nitrates and/or nitrites in the aqueous stream, causing an appropriate amount of formate ion to be present in the aqueous stream, and heating the mixture under pressure and holding the mixture at these heated and pressurized conditions for a residence time, to obtain the desired reaction.

The method of the present invention may be modified to heat the waste stream first and then cause an appropriate amount of formate ion to be present. The method of the present invention may be carried out under any pH level. The method may include further processing of the remaining aqueous products.

The advantages of the process of the present invention over existing processes include 1) removal of nitrates and nitrites in the aqueous phase, 2) reaction products are relatively benign and stable allowing recycling or further processing or disposal by conventional means, 3) reduced reactor volume as compared with bacterial treatment or gas phase treatment of nitrous oxides, 4) lower temperature operation as compared with gas phase treatment, 5) faster treatment as compared with bacterial treatment, 6) no catalyst is required, 7) it is independent of nitrate and nitrite concentration, 8) it is independent of pH, and 9) there is no need to vaporize water.

The subject matter of the present invention is particularly pointed out and distinctly claimed in the concluding portion of this specification. However, both the organization and method of operation, together with further advantages and objects thereof, may best be understood by reference to the following detailed description of the preferred embodiment.

DESCRIPTION OF THE PREFERRED EMBODIMENT

In the preferred process, nitrogen compounds present in an aqueous stream such as sewage, metal finishing nitrate wastes, and radioactive nitrate wastes, are identified and their concentrations determined. Identification and determination of concentrations of the nitrogen compounds may comprise one or a combination of 1) assessment of prior streams and deduction of composition, 2) evaporation and X-ray analysis, 3) direct electrode measurement, 4) the Kjeldahl method and variants thereof, 5) infrared, visible and ultraviolet spectrometry, 6) gas chromatography, 7) mass spectrometry, 8) chemical oxygen demand determination and 9) other standard laboratory techniques as required and conventionally practiced. We have found that when formate ion is caused to be present in an aqueous stream containing nitrates and/or nitrites, and the mixture heated to a predetermined lowest reaction temperature, under sufficient pressure to maintain an aqueous phase, and held at these conditions for a residence time, nitrogen is removed from the stream as nitrogen gas. The method may be carried out under any pH level.

Exemplary reactions illustrating denitrification according to the method of the present invention include but are not limited to the following:

$$5HCO_2H + 2HNO_3 \rightarrow N_2 + 5CO_2 + 6H_2O \quad (1)$$

$$3HCO_2H + 2HNO_2 \rightarrow N_2 + 3CO_2 + 4H_2O \quad (2)$$

$$5HCO_2 - 2NO_3 \rightarrow N_2 + 2CO_3 - - H_2O + 3HCO_3 - \quad (3)$$

$$3HCO_2 - 2NO_2 \rightarrow N_2 + 2CO_3 - - + H_2O + HCO_3 - \quad (4)$$

Equation 1 illustrates a reaction between a nitrate and a formate in an acidic (low pH) solution resulting in nitrogen and carbon dioxide gases and water.

Equation 2 illustrates a reaction between a nitrite and a formate in an acidic (low pH) solution resulting in nitrogen and carbon dioxide gases and water.

Equation 3 illustrates a reaction between a nitrate and a formate in a basic (high pH) solution resulting in nitrogen gas, water, carbonates and bicarbonates.

Equation 4 illustrates a reaction between a nitrite and a formate in a basic (high pH) solution resulting in nitrogen gas, water, carbonates and bicarbonates.

Equations 1–4 illustrate reactions in "pure" environments. In waste streams typically encountered in industrial environments, the pH is not determined by a single acid or base, but will exhibit an equilibrium between hydrogen ions and hydroxide ions. Thus, formates added to such solutions will react with the nitrates and nitrites, and the final reaction products and concentrations of reaction products will depend in part on the initial pH of the waste stream.

The reaction products illustrated in equations 1–4 include nitrogen gas which is preferably released. Other reaction products shown are intermediate products which may further react in this process to form final reaction products. The final reaction products formed depend on the particular conditions. The final reaction products may be inorganic salts, bicarbonates and others which are easily separately treatable. It will be readily apparent to those skilled in this art that the important aspects of this invention are 1) conversion of nitrogen from nitrates and nitrites to nitrogen gas, and 2) remaining products are non-hazardous.

Equations 1 and 2 do not illustrate the cations that may be present in the reaction vessel of the present invention. The formate and nitrate ions present may be derived from metal sats so that metal ions (including but not limited to copper, nickle, potassium, calcium, sodium, and magnesium) may also be present.

In a first embodiment, the method of the present invention comprises the steps of identifying the concentration of nitrates and/or nitrites in the aqueous stream, causing an appropriate amount of formate ion to be present in the aqueous stream, heating the mixture under pressure to obtain the desired reaction, and holding the mixture at the heated and pressurized conditions for a residence time.

Formate ion may be caused to be present by 1) direct addition of a component such as formic acid or a formate salt or, 2) synthesized from caustic and carbon monoxide. Synthesis is achieved by addition of carbon monoxide to a caustic nitrate/nitrite-containing stream, or by addition of both caustic and carbon monoxide to a nitrate/nitrite-containing stream and heating the mixture to temperatures from about 150° C. to about 350° C. under a pressure sufficient to maintain aqueous phase. Heating is necessary to overcome the activation energy of the synthesis reaction, but overheating can decompose the formate to hydrogen and carbon dioxide. Formate synthesis and nitrate/nitrite conversion can occur simultaneously.

In a second embodiment, formate is synthesized prior to obtaining the desired reaction wherein the method of the present invention comprises the steps of identifying the concentration of nitrates and/or nitrites, adding a caustic or basic solution, adding carbon monoxide and heating to about 150°-350° C. under pressure sufficient to maintain an aqueous phase to synthesize formate ion, then further heating to a predetermined reaction temperature under pressure sufficient to maintain an aqueous phase to obtain the desired reaction, and holding the mixture at the heated and pressurized conditions for a residence time.

In a third embodiment, the method of the present invention comprises the steps of identifying the concentration of nitrates and/or nitrites in a caustic or basic nitrate/nitrite-compound-containing stream, adding carbon monoxide and heating to about 150°-350° C. under pressure to synthesize sodium formate, further heating to a predetermined reaction temperature the mixture under pressure, and holding the mixture at the heated and pressurized conditions for a residence time to obtain the desired reaction.

The methods of these embodiments may be modified by heating the waste stream first and then adding formate ion, or adding basic solution and carbon monoxide to the waste stream to obtain the desired reaction. It is apparent to one skilled in the art that the process may be repeated to achieve complete denitrification.

The concentration of nitrates and/or nitrites may range from TKN (total Kjeldahl nitrogen) detection limits to a saturated solution.

Simply causing formate ion to be present in an aqueous stream having nitrates and/or nitrites at ambient conditions is ineffective to convert nitrates and nitrites to nitrogen gas because of the activation energy of the reactions. Therefore, such mixture must be heated to a predetermined reaction temperature of from about 200° C. to about 600° C. to overcome the activation energy of the reactions, and maintained at that temperature under sufficient pressure to maintain the aqueous stream in an aqueous liquid or supercritical phase. It is preferred to use temperatures at the lower end of the temperature range (about 200° C. to 350° C.) to reduce the pressure and amount of energy used in the process. It is preferred to use pressures at or above saturated vapor conditions at the reaction temperature. For example, at 200° C., pressure is at least 240 psi. Initial heating is accomplished by electricity, steam, radiant and/or convective flame or heat transfer oil. The aqueous stream is heated at a pressure sufficient to prevent boiling or a pressure equal to or greater than the critical pressure of water which is about 3200 psi corresponding to the critical temperature of water of about 374° C. Higher temperatures up to 600° and higher pressures may be used to reduce the time required to complete the reactions. It will be apparent to one skilled in the art that residence time may be determined by predetermined reaction temperature. Heating to a temperature lower than the minimum reaction temperature will not produce the desired results since either no reaction will occur or the reaction rate is too slow for practical use. Since the reactions are exothermic, heating during the residence time may be aided by the reactions either directly or by using a heat exchanger. In a continuous flow process, heating may be accomplished by the use of a heat exchanger to simultaneously cool an exit stream while heating an inlet stream.

The process of the invention requires maintaining the heated and pressurized conditions for a residence time. The residence time is from about 1 minute to 2 hours. The particular amount of time is determined to be that amount of time necessary to complete the reactions, depending on the predetermined reaction temperature and the concentration of formate ion. Both the initial mixture and accumulating products are held at the heated and pressurized conditions during the residence time. This permits the liquid phase reactions (reactions 1–4) to occur. In addition, there may be side reactions in an actual waste stream which produce nitrogen oxide gases, such as $N_2O$. Holding the accumulating products and the aqueous stream at the heated and pressurized conditions allows sufficient time for nitrogen oxides to be converted to nitrogen gas. Nitrogen and carbon dioxide gas products are released upon cooling and/or flashing of the reaction mixture using standard gas and liquid pressure expansion valves.

In order to reduce the concentration(s) of nitrates and/or nitrites in the waste stream below drinking water standards, it is necessary to have an amount of formate ion in substantially stoichiometric proportion to the nitrates and/or nitrites. An amount of formate ion less than stoichiometric proportion will not remove all of the nitrates and nitrites from the waste stream.

The aqueous product stream can be mixed with carbon dioxide gas at ambient or elevated temperature and pressures to react with any hydroxides present to form carbonates according to either of the following equations:

$$OH^- + CO_2 \rightarrow HCO_3^- \tag{5}$$

$$HCO_3^- + OH^- \rightarrow CO_3^{2-} + H_2O \tag{6}$$

The carbon dioxide in equation 4 may be supplied from the products of reactions 1 and 2.

EXAMPLE 1

An experiment to illustrate the process of the present invention in aqueous conditions at low pH (pH 4) at temperatures at or under 350° C. was conducted by adding 17.4 grams of nitric acid to 300 ml of phosphate buffered solution, adding 41.9 grams of formic acid, and placing the solution into a one liter stirred autoclave. The autoclave was then gradually heated to 350 degrees centigrade and gas samples were taken at half hour intervals. Pressure in the autoclave was 2870 psi, sufficient to maintain the solution in an aqueous phase. Based on periodic gas chromatograph analysis of gaseous reaction products, the nitrate began reacting with the formate at or below 250° C. and continued reacting throughout the duration of the experiment. The solution was held at temperature and pressure for a residence time of 2 hours.

In this example, 17.4 grams of aqueous nitric acid in 300 ml of phosphate buffered solution has an initial nitrogen concentration of 3870 milligrams per liter. After subjecting this solution to the process set forth above, the nitrogen concentration in solution was 0.7 milligrams per liter as determined by a standard photometric analysis. Since nitrite is a potential reduction product of nitrate, the solution was analyzed for nitrates and nitrites. The analysis showed that only nitrate was present above detection limits of 0.1 mg nitrogen per liter.

A nitrogen concentration of 0.7 mg/l is equivalent to a nitrate concentration of 3.1 mg/l which is well within national drinking water standards.

The nitrate conversion determined by gas chromatograph analysis showed that 100% of the nitrate that was converted was converted to nitrogen gas.

EXAMPLE 2

An experiment to illustrate the process of the present invention in aqueous conditions at high pH (pH 13) and at 350° C. was conducted in accordance with the procedure of Example 1. 17.45 grams of sodium nitrate were added to 300 ml of phosphate buffered solution, together with 41.78 grams of sodium formate.

In this example, 17.45 grams of aqueous sodium nitrate in 300 ml of phosphate buffered solution has an initial nitrogen concentration of 2870 milligrams per liter. After subjecting the solution to the process of this invention, the nitrogen concentration in solution was 1.0 milligram per liter as determined by a standard photometric analysis. Since nitrite is a potential reduction product of nitrate, the solution was analyzed for nitrates and nitrites. The analysis showed that only nitrate was present above detection limits of 0.1 mg nitrogen per liter.

A nitrogen concentration of 1.0 mg/l is equivalent to a nitrate concentration of 4.4 mg/l which is well within national drinking water standards.

The nitrate conversion determined by gas chromatograph analysis showed that 99.6% of the nitrogen in the nitrate was converted to nitrogen gas and that 0.3% of the nitrogen in the nitrate was converted to $N_2O$ gas.

These examples illustrate the significant denitrification of nitrates and conversion to nitrogen gas that can be achieved through the use of the present invention. Although nitrites were not tested, it is apparent to one skilled in the art that the process would be equally effective in conversion of nitrites.

Although there are many methods of denitrification of nitrates and nitrites using formate ion, only the process of the present invention is useful over a broad range of pH and is capable of achieving drinking water standards and high conversion to nitrogen gas.

This method further enjoys the advantages of fast processing, moderate temperature operation, smaller equipment, and no need for addition of a catalyst. The method can be carried out in a vessel separate from other waste conversion processes or in the same vessel as other waste conversion processes. The products of the method are nitrogen, and carbon dioxide, which can be released to the atmosphere, and hydroxides which can be further treated.

To promote the progress of science under the U.S. Constitution, the present invention has been shown and described including specific features of a preferred embodiment. It will be apparent to those skilled in the art that the invention is not limited to those specific features, but that the invention in its broader aspects is defined within the true spirit and scope of the appended claims.

We claim,

1. A method of denitrification of nitrates and nitrites in an aqueous stream, comprising the steps of:
   (a) preparing a mixture by causing formate to be present in the aqueous stream,
   (b) heating the mixture of step (a) to a predetermined reaction temperature under sufficient pressure to maintain the aqueous stream in an aqueous liquid or supercritical phase, and
   (c) holding the mixture at the conditions in step (b) for a residence time sufficient to convert the nitrogen in the nitrates and nitrites to nitrogen gas and forming an aqueous product.

2. The method as recited in claim 1, further comprising the step of:
   mixing carbon dioxide with said aqueous product to form a carbonate.

3. The method as recited in claim 1, wherein formate is caused to be present in the aqueous stream.

4. The method as recited in claim 1, wherein formate is caused to be present in the aqueous stream by synthesizing formate in the aqueous stream.

5. The method as recited in claim 1, wherein the aqueous stream has a pH between about 0 to 7.

6. The method as recited in claim 1, wherein the aqueous stream has a pH between about 7 and 14.

7. The method as recited in claim 1, wherein the residence time is from about one minute to about two hours.

8. The method as recited in claim 1, wherein an amount of formate is substantially in stoichiometric ratio to the nitrates and nitrites, resulting in a final concentration of nitrites and nitrates below 44 mg/l.

9. The method as recited in claim 1, wherein the mixture is heated to a temperature of from about 200° C. to about 600° C.

10. The method as recited in claim 9, wherein the mixture is heated from about 250° C. to about 350° C.

11. The method as recited in claim 1, wherein the pressure is from about at least 240 psi to about at least 3200 psi.

12. The method as recited in claim 11, wherein the pressure is from about at least 580 psi to about at least 2900 psi.

13. The method as recited in claim 1, wherein the residence time is determined by the predetermined reaction temperature.

14. A method of denitrification of nitrates and nitrites in an aqueous stream, comprising the steps of:
   (a) heating the aqueous stream to a predetermined reaction temperature under sufficient pressure to maintain the aqueous stream in an aqueous liquid or supercritical phase,
   (b) preparing a mixture by causing formate to be present in the aqueous stream, and
   (c) holding the mixture of step (b) at the conditions of step (a) for a residence time sufficient to convert the nitrogen in the nitrates and nitrites to nitrogen gas and form an aqueous product.

15. The method as recited in claim 14, further comprising the step of:
mixing carbon dioxide with said aqueous product to form a carbonate.

16. The method as recited in claim 14, wherein sodium formate is caused to be present in the aqueous stream by adding sodium formate to the aqueous stream.

17. The method as recited in claim 14, wherein formate is caused to be present in the aqueous stream by synthesizing formate in the aqueous stream.

18. The method as recited in claim 14, wherein the aqueous stream has a pH between about 0 and 7.

19. The method as recited in claim 14, wherein the aqueous stream has a pH between about 7 and 14.

20. The method as recited in claim 14, wherein the residence time is from about one minute to about two hours.

21. The method as recited in claim 1, wherein an amount of formate is substantially in stoichiometric ratio with the nitrates and nitrites, resulting in a final concentration of nitrites and nitrates below 44 mg/l.

22. The method as recited in claim 14, wherein the mixture is heated to a temperature of from about 200° C. to about 600° C.

23. The method as recited in claim 22, wherein the mixture is heated from about 250° C. to about 350° C.

24. The method as recited in claim 14, wherein the pressure is from about at least 240 psi to about at least 3200 psi.

25. The method as recited in claim 24, wherein the pressure is from about at least 580 psi to about at least 2900 psi.

26. The method as recited in claim 14, wherein the residence time is determined by the predetermined reaction temperature.

27. A method of denitrification of nitrates and nitrites in an aqueous stream, comprising the steps of:
(a) preparing a mixture by causing formate to be present in the aqueous stream,
(b) heating the mixture of step (a) to a predetermined reaction temperature under sufficient pressure to maintain the aqueous stream in an aqueous liquid or supercritical phase to begin forming reaction products, and
(c) holding both the mixture and reaction products at the conditions of step (b) for a residence time sufficient to convert the nitrogen in the nitrates and nitrites to nitrogen gas and form an aqueous product.

28. The method as recited in claim 27, further comprising the step of:
mixing carbon dioxide with said aqueous product to form a carbonate.

29. The method as recited in claim 27, wherein formate is caused to be present in the aqueous stream by adding formate to the aqueous stream.

30. The method as recited in claim 27, wherein formate is caused to be present in the aqueous stream by synthesizing formate in the aqueous stream.

31. The method as recited in claim 27, wherein the aqueous stream has a pH between about 0 and 7.

32. The method as recited in claim 27, wherein the aqueous stream has a pH between about 7 and 14.

33. The method as recited in claim 27, wherein the residence time is from about one minute to about two hours.

34. The method as recited in claim 27, wherein an amount of formate is substantially in stoichiometric ratio to the nitrates and nitrites, resulting in a final concentration of nitrites and nitrates below 44 mg/l.

35. The method as recited in claim 27, wherein the mixture is heated to a temperature of from about 200° C. to about 600° C.

36. The method as recited in claim 35, wherein the mixture is heated from about 250° C. to about 350° C.

37. The method as recited in claim 27, wherein the pressure is from about at least 240 psi to about at least 3200 psi.

38. The method as recited in claim 37, wherein the pressure is from about at least 580 psi to about at least 2900 psi.

39. The method as recited in claim 27, wherein the residence time is determined by the predetermined reaction temperature.

40. A method of denitrification of nitrates and nitrites in an aqueous stream, comprising the steps of:
(a) heating the aqueous stream to a predetermined reaction temperature under sufficient pressure to maintain the aqueous stream in an aqueous liquid or supercritical phase,
(b) causing formate to be present in the aqueous stream, and
(c) holding both the mixture of step (b) and accumulating reaction products at the conditions of step (a) for a residence time sufficient to convert the nitrogen in the nitrates and nitrites to nitrogen gas and form an aqueous product.

41. The method as recited in claim 40, further comprising the step of:
mixing carbon dioxide with said aqueous product to form a carbonate.

42. The method as recited in claim 40, wherein formate is caused to be present in the aqueous stream by adding formate to the aqueous stream.

43. The method as recited in claim 40, wherein formate is caused to be present in the aqueous stream by synthesizing formate in the aqueous stream.

44. The method as recited in claim 40, wherein the aqueous stream has a pH between about 0 and 7.

45. The method as recited in claim 40, wherein the aqueous stream has a pH between about 7 and 14.

46. The method as recited in claim 40, wherein the residence time is from about one minute to about two hours.

47. The method as recited claim 40, wherein an amount of formate is substantially in stoichiometric ratio to the nitrates and nitrites, resulting in a final concentration of nitrites and nitrates below 44 mg/l.

48. The method as recited in claim 40, wherein the mixture is heated to a temperature of from about 200° C. to about 600° C.

49. The method as recited in claim 48, wherein the mixture is heated from about 250° C. to about 350° C.

50. The method as recited in claim 40, wherein the pressure is from about at least 240 psi to about at least 3200 psi.

51. The method as recited in claim 50, wherein the pressure is from about at least 580 psi to about at least 2900 psi.

52. The method as recited in claim 40, wherein the residence time is determined by the predetermined reaction temperature.

* * * * *

UNITED STATES PATENT AND TRADEMARK OFFICE
CERTIFICATE OF CORRECTION

PATENT NO. : 5,118,447
DATED : June 2, 1992
INVENTOR(S) : JL Cox, RT Hallen, MA Lilga It is certified that error appears in the above-identified patent and that said Letters Patent is hereby corrected as shown below:

Title page, iem [73], Assignee's address, change "Mass." to --WA--.

In column 4, line 13, at (1) change

"$5HCO_2H + 2HNO_3 \rightarrow N_2 + 5CO_2 + 6H_2O$"

to

--$5HCO_2H + 2HNO_3 ==> N_2 + 5CO_2 + 6H_2O$--

In column 4, line 16, at (2) change

"$3HCO_2H + 2HNO_2 \rightarrow N_2 + 3CO_2 + 4H_2O$"

to

--$3HCO_2H + 2HNO_2 ==> N_2 + 3CO_2 + 4H_2O$--

In column 4, line 18, at (3) change

"$5HCO_2^- 2NO_3 \rightarrow N_2 + 2CO_3^{--} H_2O + 3HCO_3^-$"

to

--$5HCO_2^- + 2NO_3^- ==> N_2 + 2CO_3^{--} + H_2O + 3HCO_3^-$--

In column 4, line 22, at (4) change

"$3HCO_2^- 2NO_2 \rightarrow N_2 + 2CO_3^{--} + H_2O + HCO_3^-$"

to

--$3HCO_2^- + 2NO_2^- ==> N_2 + 2CO_3^{--} + H_2O + HCO_3^-$--

In column 6, line 48, at (5) change

"$OH^- + CO_2 \rightarrow HCO_3^-$"

to

--$OH^- + CO_2 ==> HCO_3^-$--

UNITED STATES PATENT AND TRADEMARK OFFICE
CERTIFICATE OF CORRECTION

PATENT NO. : 5,118,447
DATED : June 2, 1992
INVENTOR(S) : JL Cox, RT Hallen, MA Lilga It is certified that error appears in the above-identified patent and that said Letters Patent is hereby corrected as shown below:

In column 6, line 51, at (6) change to "$HCC_3{-}+OH{-} \rightarrow CO^{2-}_3 + H_2O$"

$--HCO_3{-} + OH{-} ==> CO_3^{2-} + H_2O--$

Under Claim 3, line 2 after

"aqueous stream"
insert
--by adding formate to the aqueous stream--

Signed and Sealed this

Fifth Day of April, 1994

BRUCE LEHMAN

*Attest:*

*Attesting Officer*    Commissioner of Patents and Trademarks